United States Patent [19]
Disbrow

[11] Patent Number: 5,224,215
[45] Date of Patent: Jun. 29, 1993

[54] MESSAGE QUEUE PROCESSING AMONG COOPERATIVE PROCESSORS HAVING SIGNIFICANT SPEED DIFFERENCES

[75] Inventor: John R. Disbrow, Los Gatos, Calif.

[73] Assignee: International Business Machines Corporation, Armonk, N.Y.

[21] Appl. No.: 553,203

[22] Filed: Jul. 13, 1990

[51] Int. Cl.⁵ ............................................. G06F 13/00
[52] U.S. Cl. ..................................... 395/250; 395/325; 395/425; 364/DIG. 1; 364/239; 364/239.51; 364/244; 364/244.3; 364/284; 364/284.1; 364/284.3
[58] Field of Search ............... 395/250, 275, 325, 500, 395/650, 425, 600

[56] References Cited
U.S. PATENT DOCUMENTS

| | | | |
|---|---|---|---|
| 3,336,582 | 8/1967 | Beausoleil et al. | 395/325 |
| 4,092,732 | 5/1978 | Ouchi | 395/575 |
| 4,454,595 | 6/1984 | Cage | 395/425 |
| 4,482,956 | 11/1984 | Tallman | 395/250 |
| 4,807,111 | 2/1989 | Cohen et al. | 395/250 |
| 4,980,852 | 12/1990 | Giroir et al. | 395/250 X |

OTHER PUBLICATIONS

D. A. Patterson et al., "A Case of Redundant Arrays of Inexpensive Diska (RAID)", ACM Sigmod Conference, Chicago, Illinois, Jun. 1-3, 1988.
Kluth, "The Art of Computer Programming", Second Edition, Copyright Addison-Wesley Pub. Co. 1968, 1973, vol. 1, Fundamental Algorithms, pp. 234-239, 531-534.
Brady et al., "Method and Means for Accessing DASD Arrays with Tuned Data Transfer Rate and Concurrency", Filed May 24, 1990, U.S. Ser. No. 07/528,999.

*Primary Examiner*—Paul V. Kulik
*Attorney, Agent, or Firm*—R. Bruce Brodie

[57] ABSTRACT

Processors communicatively attaching a storage subsystem and which place a message on a queue no longer have to wait on a queue lock set by another processor or sub-system dequeuing a message. This is realized by use of a double ended linked list or queue of messages having an isolation/reference point wherein an enqueuing end of the list is lockable and accessible independently from the dequeuing end of the list. The locking primitive may be of the multi-processor lock synchronizing atomic type such as TEST AND SET.

8 Claims, 4 Drawing Sheets

DEQUEUE

BEGIN EXAMPLE:
    ONE NON-BLANK IN Q

DO DEQUEUE:
    IF TOQ=BOQ, EXIT
    SET TOQ LOCK
    FIX TOQ POINTER
    RESET TOQ LOCK

DO DEQUEUE AGAIN:
    TOQ=BOQ, i.e. EMPTY OF NON-BLANKS, SO EXIT

ANOTHER EXAMPLE:

DEQUEUE TOP:

OR DEQUEUE SOME:

HOLDER OF TOQ LOCK MAY DEQUEUE ANY SELECTED ITEMS ABOVE BOQ

FIG. 4

MESSAGE QUEUE PROCESSING AMONG COOPERATIVE PROCESSORS HAVING SIGNIFICANT SPEED DIFFERENCES

FIELD OF THE INVENTION

This invention relates to a method and means for passing messages between processors having order of magnitude speed differences to avoid pacing the message exchange by the lower speed. Such message passing occurs between concurrently executing CPU's and an external storage sub-system (e.g. synchronous direct access storage device (DASD) array).

DESCRIPTION OF RELATED ART

Contemporary high speed processing or supercomputing conjures up the prospect of 1000 million instructions per second (MIPS) of coordinate computing across multiple processors aperiodically referencing substantially slower specialized processors such as DASD array controllers. Synchronization among processors still requires a combination of locks and messages. Locks serve to bind resources to tasks while messages and their processing itself operate as synchronizing events. In contemporary systems, task oriented messages are enqueued against resources. Also, the queued access is governed by a global lock. Thus, operations are paced by the slowest processor obtaining locked access to the queue.

Processors, Shared Internal Memory, Messages, and Queues

A single CPU or processor typically includes a local operating system (OS), RAM implemented internal memory, local instruction and data caches operatively formed from the internal memory, an external store, and lock, cache, and storage resource managers. However, high speed or supercomputing involves applications executing over several processors. The applications initiate tasks in the form of OS instructions (READ/WRITE). These tasks are queued against the resources which process them. In this case, these are the general and special purpose processors of the high speed system. The tasks are relatively synchronized (ordered) with respect to each other by their position placement as messages in the queue in a commonly accessible portion of processor shared internal memory.

The messages (tasks) are expressed as encapsulated operations defined over a range of addresses. Where the messages relate to accessing external storage, they are enqueued by processors in the shared memory and await dequeuing and execution by the storage sub-system. Concurrently, messages indicative of altered or completed storage access tasks are also enqueued by the storage sub-system in the shared memory and await dequeuing and execution by the processors. By locking the queue, the slowest processor such as the external store (array controller) can pace the entire operation.

Mismatches Abound

As mentioned above, synchronization is achieved among processors and tasks using queued access messages usually controlled by some form of locking. However, where there is a raw disparity in capacities, then much may go to waste while the faster processor awaits access to a queue currently bound (locked) to a substantially slower processor.

Even where the processor engages external DASD storage without delay, there may be a gross mismatch of data rates. Illustratively, concurrent processors executing 100 MIPS and a 100 MByte/sec data transfer rate attempt to communicate with a gigabyte DASD having a 1 to 3 MByte transfer rate and a 10 millisecond access time.

Patterson et al, "A Case for Redundant Arrays of Inexpensive Disks (RAID)", ACM SIGMOD Conference, Chicago Ill., Jun. 1-3, 1988 discusses the general solution with respect to data rate matching in the form of accessing N synchronized DASDs in parallel. Synchronous behavior requires N DASDs to rotate at the same rpm, have the same angular offset, and be accessed in an identical manner at the same time.

Interlocks and Locable Buffers

As an alternative to communicating data in parallel via Patterson's synchronized DASD's, data rate mismatch has been managed by interlocks or lockable buffers. Buffer size and cost have remained as obstacles.

Beausoleil et al, U.S. Pat. No. 3,336,582, "Interlocked Communication System", issued Aug. 15, 1967, shows an interlock over which a low speed processor paces the transfer from a high speed processor. That is, a low speed processor such as a storage control unit (IBM 3880) strobes a CPU/channel (S/370) over a demand response interface indicating that it is available to process the next information unit.

Cage, U.S. Pat. No. 4,454,595, "Buffer For Use With A Fixed Disk Controller", issued Jun. 12, 1984, discloses a multi-ported random access memory managed by address register manipulation as an asynchronous partitioned circular buffer. Data is read from or written into consecutive RAM addresses on a partition-at-a-time basis in wrap-around (circular) order. A partition/block consists of a fixed number of consecutive RAM addresses sized to hold a track sector of data, the RAM buffer having a capacity of at least two such partitions.

In Cage's buffer, the speed of the movement of fixed blocks of data is matched between the main memory (DMA) of a word processor and an attached DASD. A DASD write or read command results in data being moved either from the DMA or a DASD track sector into a first RAM partition. Because RAM operations are asynchronous, a demand transfer from a second RAM partition can be overlapped with the first movement as an atomic part of the command (DASD read or write) being executed.

Knuth, "The Art of Computer Programming", Second Edition, copyright Addison-Wesley Pub. Co. 1968, 1973, Vol.1 Fundamental Algorithms, pages 234-239, 531-534, describes a "deque" as a linear list in which all insertions and deletions are made at the ends of the list. He further defines an "input restricted deque" as a linear list in which items may be inserted at one end and removed from the other end (Sec.2.2.1 Exercise 1).

SUMMARY OF THE INVENTION

It is accordingly an object of this invention to devise a method and means permitting processors of disparate speed to have overlapped access to either add or remove messages in queued access (position order processing) relation to each other.

It is a related object that such method and means utilize simple meta-processor lock primitives. In this regard, "meta- processor" connotes available to all processors.

With respect to the aforementioned objects, processors of disparate speeds such as a CPU and an external storage sub-system placing a message on a queue no longer have to wait on a queue lock set by another processor or sub-system dequeuing a message. This is realized by use of a double ended linked list or queue of messages having an isolation/reference point (NULL/BLANK) wherein an enqueuing end of the list (BOQ/BOQL) is lockable and accessible independently from the dequeuing end of the list (TOQ/TOQL). The locking primitive may be of the multi-processor lock synchronizing atomic type such as TEST AND SET.

More particularly, the objects of the invention are satisfied by a method for passing task oriented messages between a plurality of high speed processors and an external storage sub-system communicatively coupled over a shared memory. The method steps comprise: (a) defining first and second dense linked linear lists in the shared memory, each list having independently lockable first and second ends thereof; (b) obtaining a first lock by a processor on the first end of the first list when available, inserting messages between the first end and the last message so linked, and releasing said first lock; (c) obtaining another lock by the sub-system on the second end of the first list when available, removing messages anywhere on the list, and releasing said other lock; and (d) repeating steps (b) and (c) on the first and second ends of the second list by the storage sub-system and a processor respectively.

DESCRIPTION OF THE PREFERRED EMBODIMENT

The preferred embodiment of this invention uses a high speed multi-processor host interacting with a slower external store. The external store is illustratively expressed as a synchronous array of N DASD's and an array controller. To enhance appreciation of this form of external storage as used in this invention, a brief description of data organization on the array (striping) and the use of information redundancy (parity blocks, ECC) is provided.

Patterson's RAID Type 3 DASD Array as External Storage

Patterson's type 3 DASD array synchronously reads and writes to N DASDs in column major order. However, N-1 of the DASD's contain data and one DASD contains a parity ranging over the other data DASDs. That is, one check DASD is provided for the group. The contents of the failed DASD can be reconstructed in the manner of Ouchi discussed in the next paragraph.

Intra-Block Parity and the Interblock Parity Code Block

Ouchi, U.S. Pat. No. 4,092,732, "System for Recovering Data Stored in a Failed Memory Unit", issued May 30, 1978 discloses the spreading of data blocks from the same logical file across a string of N- 1 DASD's and recording a parity block on the Nth DASD which parity block is an XORing of the parity contents of the N-1 other blocks. Contents from any single inaccessible DASD can be recovered by XORing the parity blocks with the blocks stored on the N-2 remaining accessible DASD's. A similar result can be achieved if the parity blocks are not available.

Typically in block oriented data, a parity suffix or equivalent (Hamming, CRC) is appended to each data block. Thus, each parity suffix can be invoked to detect/correct intra-block error. As described in Ouchi, when one or more of the blocks of an N-1 sequence are unavailable, a parity block, which a' priori spans the N-1 block sequence, is used in conjunction with the remaining blocks to rebuild the unavailable data block. Efficient codes per se (Hamming, Cyclic Redundancy Check, Reed-Solomon) are elsewhere treated in the literature and are deemed ancillary to the invention as subsequently described.

Multiple Processor Host/External Storage Architecture

Figure 1:
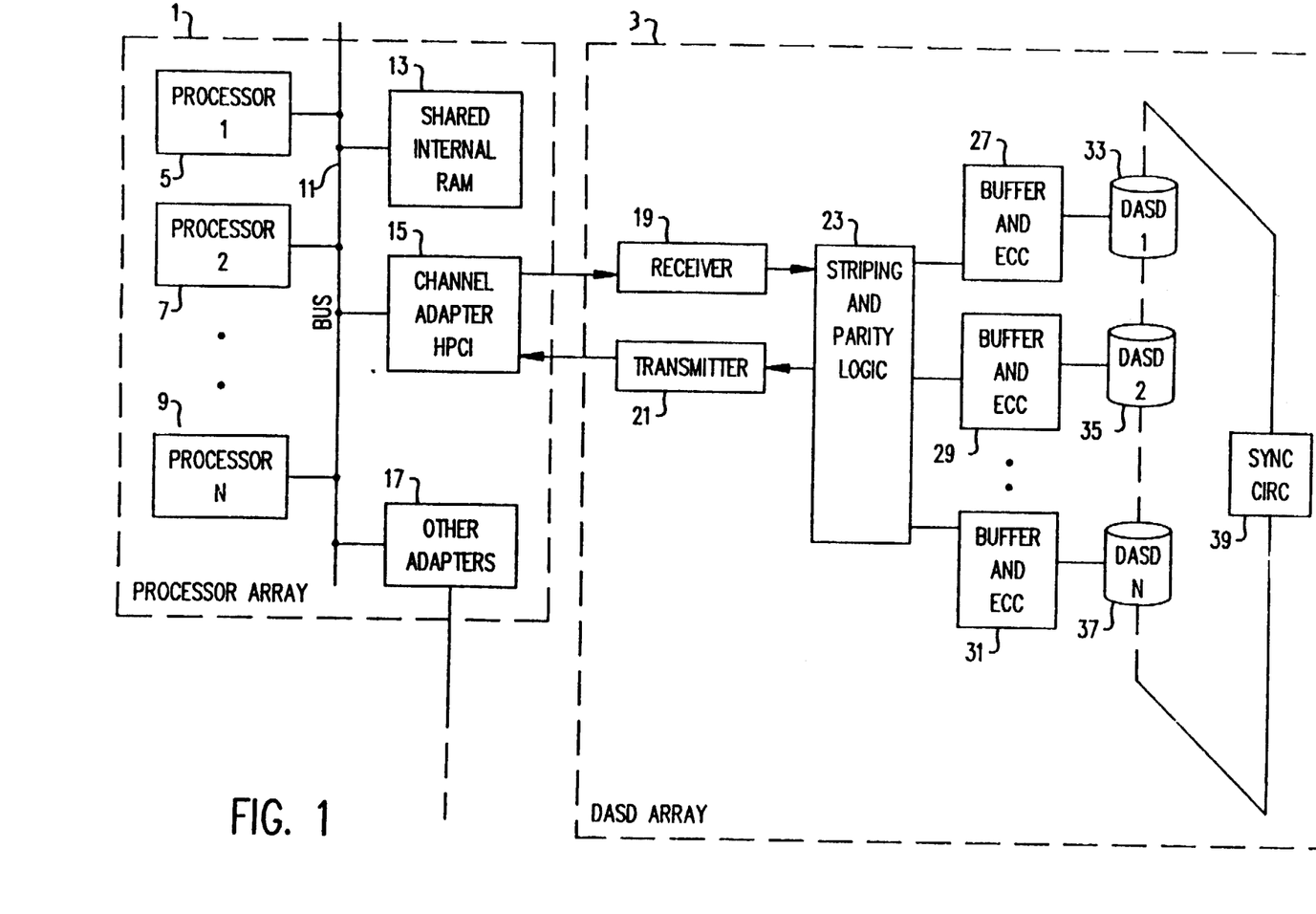
FIG. 1 shows a CPU/ DASD array data flow emphasizing shared internal memory, high performance channel interface (HPCI), array controller, and DASD's.

Referring now to FIG. 1, there is shown a system including a an array of processors 1 coupling as external storage a synchronous DASD array 3. The processors 5, 7, 9 are of the high performance variety such that when operated concurrently have processing speeds in the order of 100+ MIPS. A slower special purpose processor in the form of DASD array 3 is coupled to array 1 by way of adapter 15. Other information processing sources or sinks such as local area networks, printers, or displays would likewise be coupled over counterpart adapters 17.

The fast and slow processors communicate within array 1 over a very high speed bus 11 using a portion of shared internal RAM 13 as a specialized message repository. The processors constitute a distributed peer coupled system with no centralized operating system or process control. All resources such as internal memory 13, interrupt facility, and global registers (not shown) are available to any processor including the external storage or DASD array subsystem (DAS) 3.

DAS 3 preferably comprises a RAID3 type DASD array and an associated array controller as described for example in the Patterson reference and in the co-pending Brady et al. application, U.S. application Ser. No. 07/528,999, "METHOD AND MEANS FOR ACCESSING DASD ARRAYS WITH TUNED DATA TRANSFER RATE AND CONCURRENCY", filed May 24, 1990. Even though DAS operates in a peer-coupled relationship with the other processors, it nevertheless queues task oriented messages against other processors or resources. Any change in the queue or other action requests such as halt current operations are indicated by way of special purpose signals (tap signals).

DAS receives tasks as messages and communicates the results of task processing via control blocks arranged in the form of a dedicated queue. This queue, as exemplified in FIG. 2, remains in host 1 internal memory 13. Parenthetically, the system includes a facility to reorder the queue according to changing system priorities.

Referring again to FIG. 1, there is shown an array controller (elements 19-31) coupling the host bus 11 by way of channel adapter 15. This path provides access to all system resources including memory 13, global registers, and tap signals on behalf of DAS 3. Adapter 15 preferably attaches DAS over a pair of simplex megabyte rate receive and transmit interfaces 19, 21. The interfaces know also as High Performance Parallel Interfaces (HIPPI) are described in the ANSI Draft Standard of Aug. 29, 1989, X3T9/88-127, Revision 6.8. This facilitates receipt of the so-called tap signals from the host and access to the host as initiated by DAS.

Host or system functions available for DAS use include READ/WRITE internal memory 13, atomic TEST AND SET for lock operations in internal memory 13, atomic operations on global registers, receipt and interpretation of tap signals from other processors or system elements, and the generation of tap signals to the system or host.

DAS 3 operates one addressable array of DASD's 33, 35, 37 synchronized via sync circuit 39 to each rotate at the same rpm, have the same angular offset, and be accessed in an identical manner at the same time. This solution maximizes data transfer rate. This permits high speed sequential or skip sequential DASD data transfer.

Data movement in the Host/DAS direction starts from internal memory 13 over bus 11 through adapter 15, receiver 19, ending in striping and parity logic 23. Logic 23 includes the necessary digital and timing circuits to calculate a parity block by XORing the N-1 data blocks and transferring counterpart blocks to ones of the buffer and ECC circuits 27, 29, and 31. Each block is also protected by appending an ECC byte thereto for error detection and correction on an intra-block basis. Access to the N DASD's is made synchronously in the conventional manner. The obverse obtains when data movement proceeds in the DAS/Host direction.

DAS I/O Operation

The task or request is defined in a control block termed a DASD Control Block or DCB. A processor at the host builds a DAS DCB in internal memory 13. It then links the DCB to a WAIT queue for DAS and signals the enqueuing operation. Subsequently, DAS moves the DCB onto the ACTIVE LIST, performs DCB requested functions, updates the DCB and places it on the COMPLETION queue. After detecting the I/O completion, the host dequeues the updated DCB from the COMPLETION queue and ascertains the outcome of the DCB specified operation.

Restated, a DAS I/O request is responsive to any processor 5-9 invoking a READ/WRITE from its OS. A DCB is built and placed on a WAIT queue located in internal memory 13. A tap signal is then sent to DAS. In turn, the DAS inspects the queue for the next queued DCB using any one of a number of work management algorithms (FIFO, FILO, LIFO etc.). DAS does not need to respond to the tap signal as a priority event.

Figure 2:
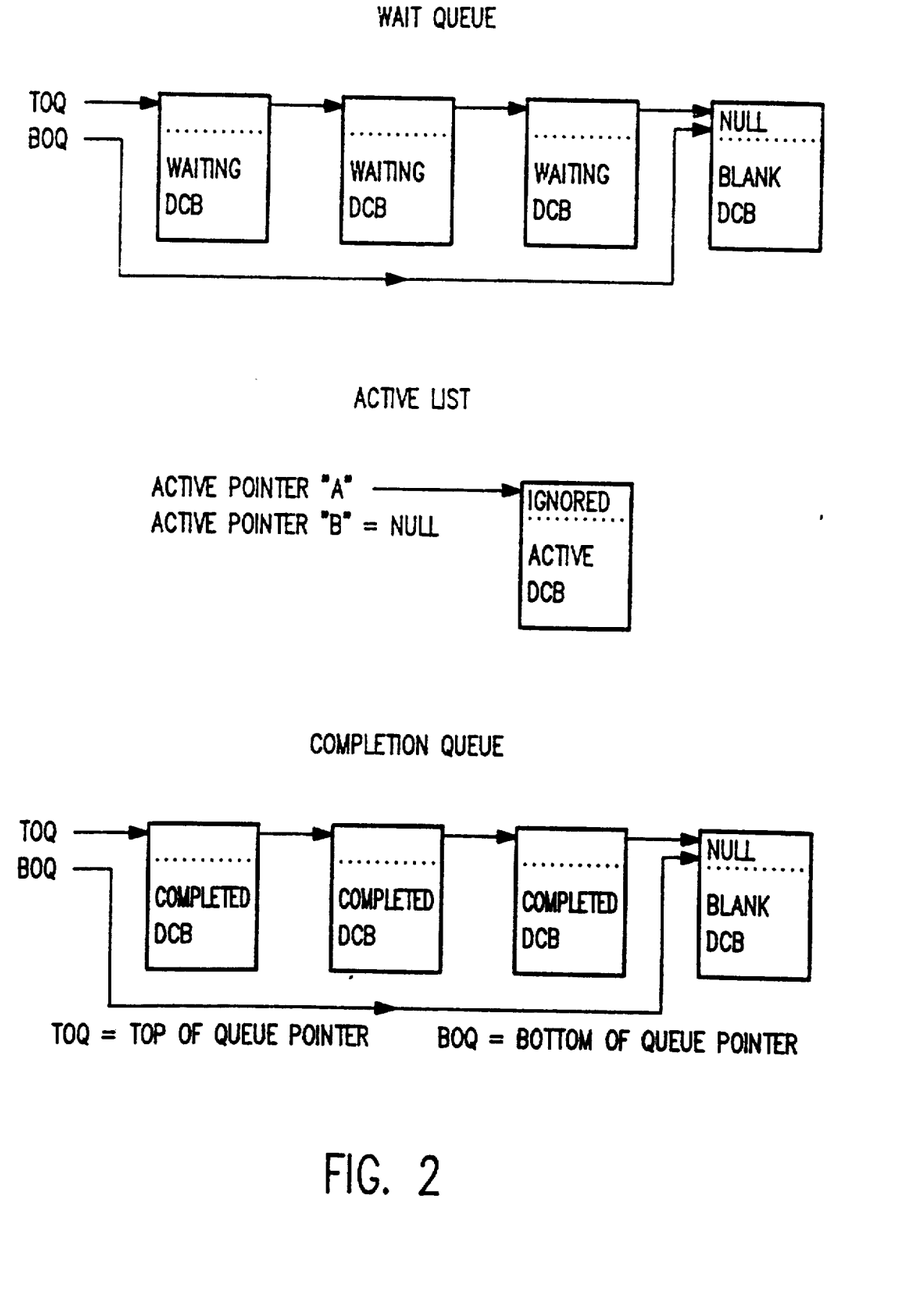
FIG. 2 respectively depict a wait queue, an active list, and a completion queue of DASD control blocks (DCB's) selectably lockable at either end thereof.

Referring now to FIG. 2, the system is arranged such that the DAS "task WAIT queues" are priority ordered. A request may be relocated in the queue relative to other tasks or DCB's at any time prior to its being made active by the DAS. In this invention, such reordering is a special function of a DEQUE operation to be explained subsequently. Note, that the DCB's remain at the same internal memory 13 real address irrespective of changes in queue linking priority of active/waiting status.

One of the attributes of peer-coupled processors is that the DAS is responsive to receipt either of a tap signal or its work management algorithm by finding the next queued DCB via reading an anchor pointer in internal memory 13 established during initialization and changing the first waiting DCB status from "WAITing" to "active". This is accomplished by moving the DCB show FIG. 2 to the ACTIVE LIST per FIG. 2B. This is brought about by the DAS executing a sequence of internal memory access operations. Once the DCB is "active", the DAS processes the DCB according a function code contained in said DCB. Relatedly, address information in the DCB define the extent of data to be transferred. In this regard, the data transfer is effectuated by DAS initiated operations through the channel adapter 15.

It should be appreciated that each DCB can assume one of three states, namely, "active", "waiting", or "completed".

When a data transfer operation is completed, the DAS writes completion status in the DCB, changes the DCB state as per FIG. 2 from "active" to "completed", and enqueues the DCB on the associated completion queue per FIG. 2. Also, the DAS may execute a number of DCB specified completion notification primitives. Significantly, the transfer of data to and from internal memory 13 and the DAS is under DAS control.

Queue Defined

Referring now again to FIG. 2, there are shown several queues of DCB's. In this regard, each queue element, generically called QEL, is a contiguous set of words in a memory which both processor classes can fetch from and store to in shared memory 13. A QEL includes message words as well as a link pointer word required for queueing. Although each QEL could be a different length, advantageously a simple system might use uniform sized QELs of, perhaps, 32 words each. Relatedly, for purposes of this invention, each shared memory word itself consists of at least enough bit positions to contain the address of any other word. For example each word of shared memory could be 64 bits long.

As used in the specification and FIG. 2, the term "pointer" refers either to an address, or, to a place where such an address is found. Context determines which is meant. Relatedly, a pointer to a QEL is the address of one of the words in the QEL. The word pointed to, the link pointer word, normally contains the address of another QEL, but can contain a predetermined null value such as all bits off, or all on.

As illustrated FIG. 2, a Blank-QEL is a QEL whose link pointer word is null. Also, a queue may be formed from either a single Blank-QEL, or a set of QELs linked one to another by pointers leading from a top QEL to a bottom QEL. The latter is always a Blank-QEL when the bottom pointer is unlocked.

Queues are locked by using a multiprocessor synchronizing lock operation available to all participating multiprocessor classes. An example is the classic Test and Set operation which stores a lock constant in a word of shared memory. If the preceding fetch, which is part of the same atomic operation, returns a value other than this lock constant, then the Test and Set operation has successfully locked the lock word.

Referring yet again to FIG. 2, a queue header consists of four words in the shared memory as shown following:

---

TOQ  Top of Queue Pointer: Shared memory address of

-continued

| | |
|---|---|
| | link pointer word of the top QEL in the queue. |
| BOQ | Bottom of Queue Pointer: Shared memory address of link pointer word of the bottom QEL in the queue. |
| TOQL | TOQ Lock Word. For example a Test and Set lock word. Only the holder of the TOQ lock may alter the TOQ pointer or any of the contents of QELs linked above the QEL pointed to by BOQ. (Note that the BOQ pointer may change while TOQ is locked; see BOQL.) |
| BOQL | BOQ Lock Word. Only the holder of the BOQ lock may alter the contents of the QEL at the bottom of the queue, possibly making it non-blank. Only the BOQL processor/holder may change the BOQ pointer value, and then only if the new value is the address of a valid Blank-QEL. |

Changing the BOQ pointer moves the isolation point between the enqueuing and dequeuing processes. Once the BOQ is changed, the BOQ lock holder's authority to update is reduced to the New- Blank-QEL and to the BOQ pointer. A TOQ lock holder is always free to update any QELs down to, but not including, the QEL pointed to by the BOQ, whether the BOQ is locked or not.

Applying the above definitions to FIGS. 2A-C, there are shown constructs indicative of the three states into which each DCB must be resolved (wait, active, completed). DCB's classified as waiting or completed are enqueued while an active DCB is being processed. In each queue, each DCB has a pointer to the next DCB in the chain. The BOQ points to a null or blank DCB operative as the queue bottom while TOQ points to the most recent queue addition.

Enqueue Operation

Figure 3:
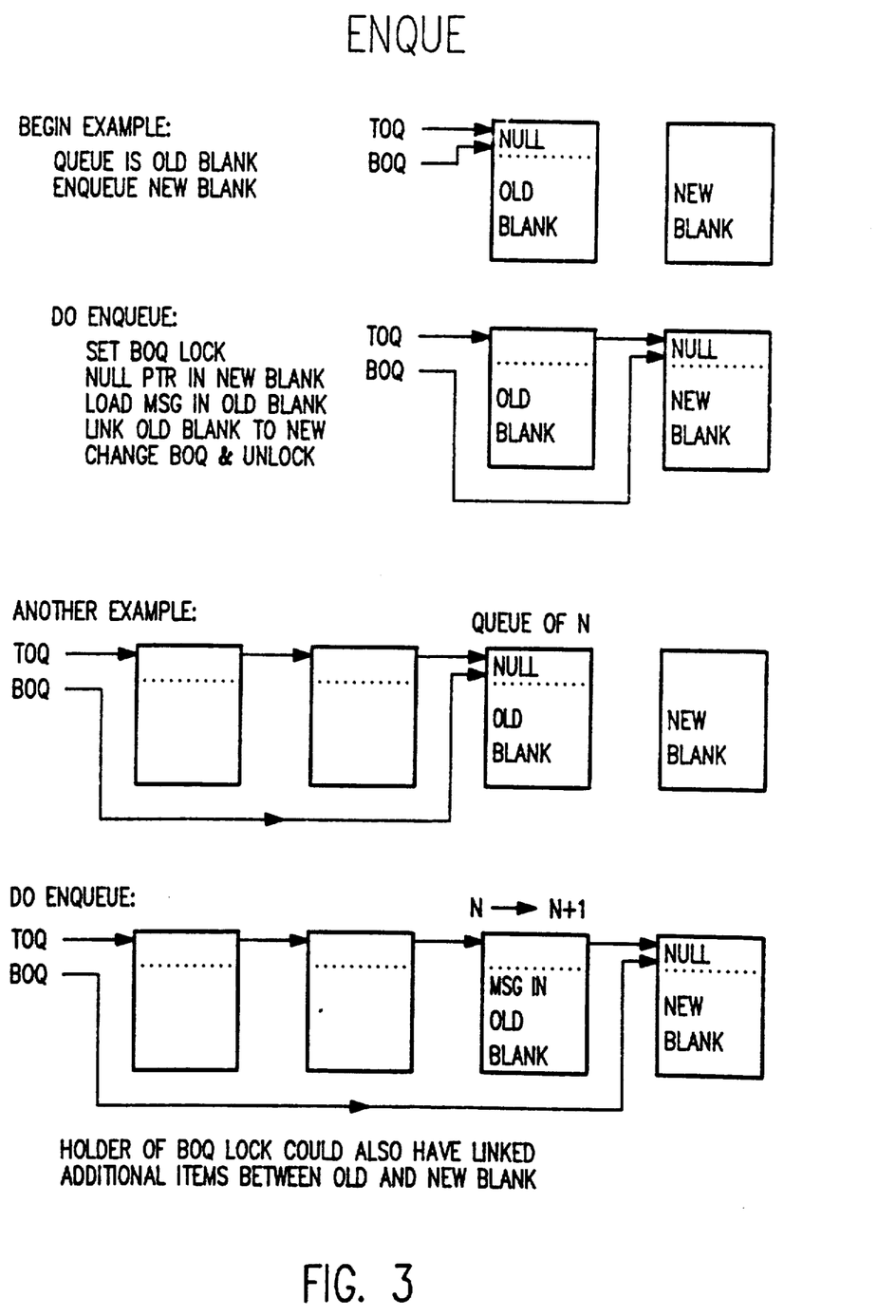
FIG. 3 illustrates the enqueue operation on a DCB wait and completion queue.

Referring now to FIG. 3, there is depicted an enqueue operation as the loading of a message into the Blank-QEL at the bottom of a queue, and the appending to the bottom of the queue of an additional QEL as the New-Blank-QEL. The enqueue operation includes the steps of:

1. locking BOQ, conditionally waiting for the queue to become available; 2. writing a null into link pointer of the additional QEL, "New-Blank"; 3. writing the memory address of New-Blank into Linkage Pointer of Old-Blank; 4. loading a message into the former Blank-QEL, "Old-Blank"; 5. putting memory address of New-Blank into the BOQ pointer word; and 6. unlocking BOQ.

The original queue has not been altered except for the contents of the original Blank-QEL. The original Blank-QEL was initially at the bottom of the queue. Only the processor/holder of the TOQ lock may alter the queue's on-blank QELs.

The enqueuing processor can add more than one QEL. In preparation for enqueuing, the additional QELs are to be linked one to another from Top-Addnl-QEL to Bot-Addnl-QEL. The steps are listed below in an order which continuously maintains a well formed queue. Note, a "well formed queue" refers to a TOQ-BOQ pair and its associated queue conforming to the above definitions.

1. locking BOQ, perhaps waiting for it to become available;
2. putting null into link pointer of Bot-Addnl-QEL, making it New-Blank;
3. loading messages into Old-Blank, and all Addnl-QELs except New-Blank;
4. putting memory address of Top-Addnl into link pointer of Old Blank;
5. putting address of New-Blank into BOQ; and
6. unlocking BOQ.

Dequeue Operation

Figure 4:
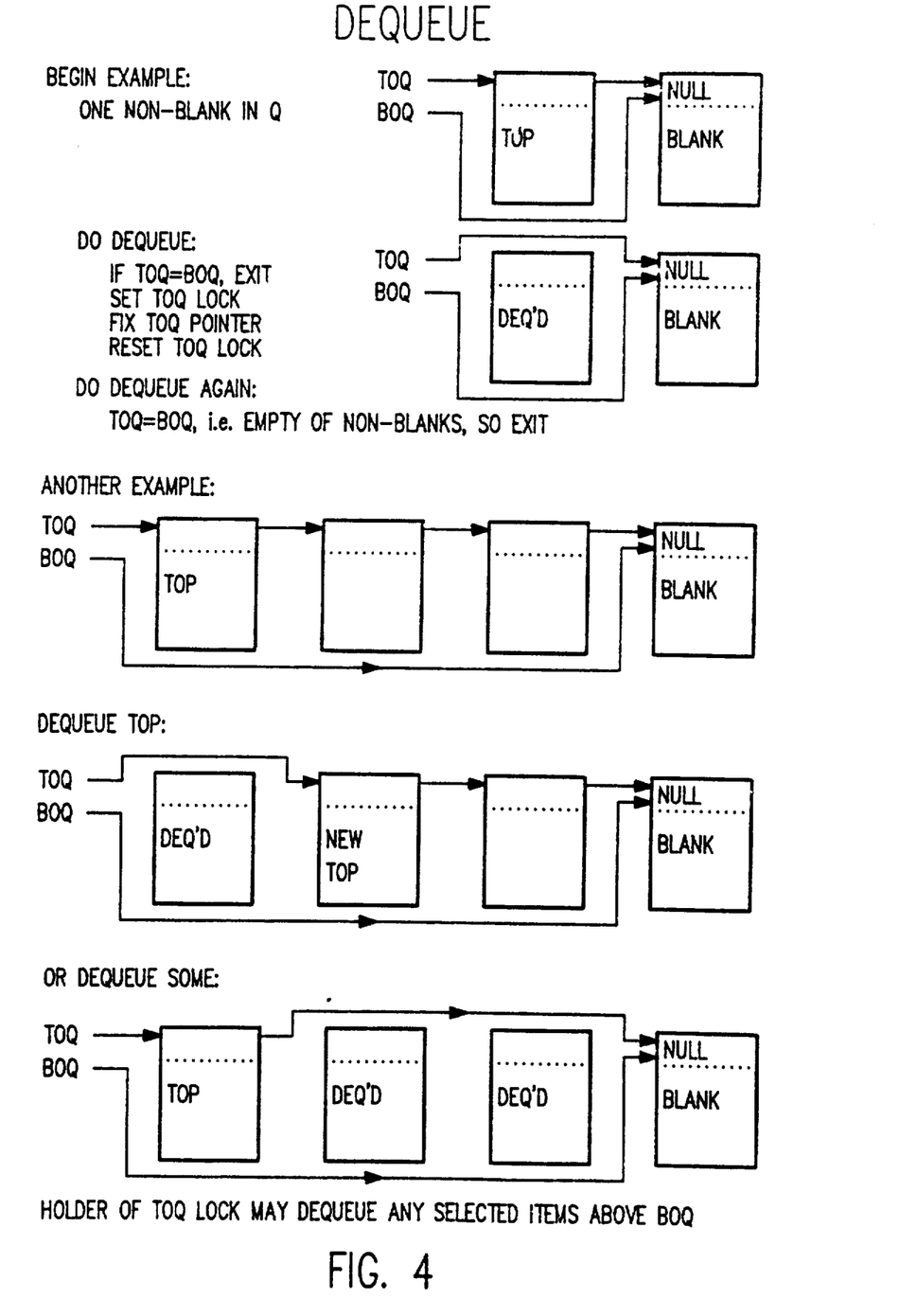
FIG. 4 sets forth the dequeue operations on a respective first and second example of a DCB wait and completion queue.

Referring now to FIG. 4, there are depicted two examples using a DEQUE operation in which a single QEL is removed from the top of a queue. A processor copies into the TOQ the contents of the link pointer from the first QEL in the queue. To remove a continuously linked sequence of QELs, a processor changes the TOQ pointer, or a single QEL link pointer, so as to point around the QELs being removed. The dequeue steps are listed below in an order which continuously maintains a well formed queue.

1. if TOQ=BOQ, exiting without locking as queue is empty of non-blanks;
2. locking TOQ, conditionally after waiting for it to become available;
3. reading BOQ, any QEL at that address or linked beyond it is ineligible;
4. removing one or more eligible QELs from anywhere on the queue; and
5. unlocking TOQ.

The QEL pointed to by BOQ, when BOQ is read, is treated as ineligible. While a BOQ lock holder may make this a valid QEL and may change BOQ, the QEL will remain ineligible for this execution of enqueue or reorder.

Reorder Operation

Reordering is a two step process in which QEL(s) are first dequeued from, and then reinserted into, the eligible QEL chain. The processor doing the reordering holds the TOQ lock for the duration of both steps. So to move a single QEL, called "Moving-QEL", to the top of the queue, a processors dequeues the QEL, as defined previously, and then reinserts it by changing Moving-QEL's link pointer to the value in TOQ, and putting the address of Moving-QEL into TOQ.

In a similar manner a processor can dequeue any number of eligible QELs, link them together in one or more fragmentary chains, and then reinsert the fragments back into the queue. Reinsertion can be done maintaining a well formed queue by:

1. setting link pointer of fragment's final QEL to address of QEL that will follow fragment in queue; and
2. setting TOQ pointer, or link pointer of QEL that is to precede fragment, to the address of first QEL in fragment.

Extensions

For any operation to continuously maintain a well formed queue, each single word storage update of a pointer in shared memory must complete fully. If a process then follows the steps of an operation in the order given, the queue will remain well formed. In the event of most hardware failures, or of a premature process termination, some in-transit QELs may not be on the queue, but the queue itself will remain well formed. Other processes will be able to continue working with such a queue.

In the initial example the allocation of shared memory can be a processor only function. This can be achieved by having the controllers reuse each work queue element as the QEL in which to report completion status.

I claim:

1. A method for passing task oriented messages between a plurality of high speed processors and an external storage sub-system communicatively coupled over a shared memory, comprising the steps of:
   (a) defining first and second dense linked linear lists in the shared memory, each list having independently lockable first and second ends thereof;
   (b) obtaining a first lock by a processor on the first end of the first list when available, inserting messages between the first end and any last message so linked, and releasing said first lock;
   (c) obtaining another lock by the sub-system on the second end of the first list when available, removing messages anywhere on the list, and releasing said other lock; and
   (d) repeating steps (b) and (c) on the first and second ends of the second list by the storage sub-system and a processor respectively, concurrent access to non-overlapping sets of messages by the storage sub-system and a processor to the same list occurring either to the first and second ends of the second list or the second and first ends of the first list respectively.

2. A method for passing task oriented messages in a system having a plurality of high speed processors, an external storage subsystem, shared internal memory, and means utilizing the shared internal memory for enqueuing messages by the processors and for dequeuing messages by the storage subsystem in a first direction, and, for enqueuing messages by the storage subsystem and for dequeuing messages by the processors in a second direction, each processor accessing a lock primitive (Test and Set), accessing a lock including comparison matching a resultant from executing a lock primitive with a lockword, comprising the steps of:
   (a) defining first and second linked linear lists in the shared internal memory, reference points and operator sets over the lists, each operator set including a top of list (TOQ) and bottom of list (BOQ) pointers, top of list (TOQL) and bottom of list (BOQL) lockwords, each list having a top of the list end and a bottom of the list end;
   (b) obtaining a first lock by one of the processors on the BOQ end of the first list upon comparison matching the BOQL with the resultant of executing the lock primitive by said one processor, embedding messages between a reference point and any last message including a null message so connected in the list, and releasing said first lock;
   (c) obtaining another lock by the sub-system on the TOQ end of the first list only upon comparison matching the TOQL with the resultant of executing the lock primitive by the subsystem, removing one or more messages from said list, and releasing said other lock;
   (d) repeating steps (b) and (c) on the BOQ and TOQ ends of the second list by the storage sub-system and a processor respectively, concurrent access to non-overlapping sets of messages by the storage sub-system and a processor to the same list occurring either to the BOQ and TOQ ends of the second list or the TOQ and BOQ of the first list respectively; and
   (e) reordering the list of messages by obtaining another lock by the sub-system on the TOQ of the first list when available, removing messages anywhere on the list, linking at least some of the dequeued messages together in one or more fragmentary chains, and then reinserting the fragmentary chains back into the queue, and releasing said other lock.

3. The method according to claim 2, wherein only the processor holding said other lock (TOQL) may alter any pointer to the TOQ end of the list or any of the messages at the BOQ end of the list, and further wherein only the processor holding the first lock (BOQL) may alter any pointer designating the BOQ end on the list.

4. The method according to any one of the claims 1, or 2, wherein the processors originate messages in the form of a sub-system control blocks (DCB's), each DCB specifying one or more access operations to be executed by said sub-system, and further wherein said DCB's being enqueued on the first list by the originating processors, said sub-system dequeuing and processing each DCB from said first list according to either an external discipline (LIFO, FILO, FIFO) or to a priority reordering of said first list or portion thereof.

5. The method according to claim 4, wherein each DCB assumes either a waiting, active, or completed status, the waiting DCB's constituting the first list, active DCB's being currently processed, and completed DCB's constituting the second list.

6. The method according to any one of claims 1 or 2, wherein said sub-system includes at least a first synchronous DASD array and at least a first controller means for accessing said array and for sending and receiving messages to and from the shared memory.

7. A system having a plurality of fast processors communicatively coupling an external storage sub-system by way of a shared memory, said system comprising:
   means responsive to messages originating from selected processors for writing the messages into the shared memory, linking said messages into a wait queue, and signaling the storage sub-system;
   means at the storage sub-system aperiodically responsive to said signaling for dequeing the messages from the wait queue, actively processing the dequeued messages, enqueuing the processed messages onto a completion queue in said shared memory, and signaling the system; and
   means aperiodically responsive to the sub-system signals for dequeing the processed messages form the completion queue;
   wherein said system further comprises:
   means for defining a pair of linked lists in the shared memory with separately lockable ends; and
   means for operating said lists as oppositely poled queues (processor to subsystem direction, and subsystem to processor direction) supporting message passing between high and low speed processors by enqueing messages on each list by a processor or the sub-system lockably independent from
   (i) the dequeuing of messages by the sub-system if the processor enqueues the messages, or,
   (ii) the dequeuing of messages by the processor if the sub-system enqueues the messages on the sample list,
   said means for operating said lists include
   means for managing concurrent access to non-overlapping sets of messages by the storage sub-system and a processor to the same list occurring either to the first and second ends of the second list or the second and first ends of the first list respectively; and means for reordering the list of messages by obtaining another lock by the sub-system on the second end of the queue poled in the processor to sub-system direction when available, removing messages anywhere on the list, linking at least some of the dequeued messages together in one or more fragmentary chains, and then reinserting the fragmentary chains back into the queue, and releasing said other lock.

8. The system according to claim 7, wherein the external storage sub-system further comprises at least a first synchronous DASD array, and at least a first controller means coupling said first array to the shared memory via the enqueuing/dequeuing means at said sub-system.

* * * * *

UNITED STATES PATENT AND TRADEMARK OFFICE
CERTIFICATE OF CORRECTION

PATENT NO. : 5,224,215
DATED : June 29, 1993
INVENTOR(S) : J. R. Disbrow

It is certified that error appears in the above-indentified patent and that said Letters Patent is hereby corrected as shown below:

Column 10, line 40 delete "dequeing" and add --dequeuing--
Column 10, line 46 delete "dequeing" and add --dequeuing--
Column 10, line 46 delete "form" and add --from--
Column 10, line 55 delete " equeing" and add --enqueuing--.
Column 10, line 61 delete "sample" and add --same--

Signed and Sealed this

Twenty-seventh Day of June, 1995

Attest:

BRUCE LEHMAN

*Attesting Officer*

*Commissioner of Patents and Trademarks*